(12) United States Patent
Ozawa et al.

(10) Patent No.: US 7,755,781 B2
(45) Date of Patent: Jul. 13, 2010

(54) IMAGE FORMING APPARATUS, IMAGE FORMING METHOD AND RECORDING MEDIUM

(75) Inventors: Masahiro Ozawa, Hachioji (JP); Yoshinori Tanaka, Hachioji (JP); Hiroshi Nogawa, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 842 days.

(21) Appl. No.: 11/656,369

(22) Filed: Jan. 23, 2007

(65) Prior Publication Data
US 2008/0018933 A1 Jan. 24, 2008

(30) Foreign Application Priority Data
Jul. 24, 2006 (JP) .............................. 2006-200612

(51) Int. Cl.
G06F 15/00 (2006.01)
G06F 15/16 (2006.01)
(52) U.S. Cl. ...................................... 358/1.13; 709/206
(58) Field of Classification Search ............... 358/1.13, 358/1.15, 1.14, 1.16, 1.18, 1.17, 1.9, 3.28, 358/474, 2.99, 403; 709/203, 206; 715/234; 707/101, 102, 1, 2, 3, 6, 9; 711/144, 164, 711/128
See application file for complete search history.

(56) References Cited
U.S. PATENT DOCUMENTS
2001/0013926 A1 8/2001 Funahashi

2002/0026453 A1* 2/2002 Mori et al. ............... 707/104.1
2006/0092470 A1 5/2006 Yamada FOREIGN PATENT DOCUMENTS
| JP | 11-170631 | 6/1999 |
| JP | 11-284818 | 10/1999 |
| JP | 2001-228991 A | 8/2001 |
| JP | 2002-057863 | 2/2002 |
| JP | 2006-116846 | 5/2006 |

OTHER PUBLICATIONS

Notification of Reason for Refusal in JP 2006-200612 dated Jan. 13, 2009, and an English Translation thereof.
Notification of Reason for Refusal in JP 2006-200612 dated Apr. 14, 2009, and an English Translation thereof.

* cited by examiner

*Primary Examiner*—Saeid Ebrahimi Dehkordy
(74) *Attorney, Agent, or Firm*—Buchanan Ingersoll & Rooney PC

(57) ABSTRACT

Disclosed an image forming apparatus including: a data receiving section; a memory section comprising a shared storage area; an analysis section to generate an intermediate data from the page-description language; a rasterizing section to generate the bitmap data from the intermediate data and to release an storage area; and a print control section to allow a printing section to perform printing, and to release an storage area; wherein a rasterizing section comprises a judgment section to judge whether or not the following condition expression is satisfied when the shared storage area is run out,

(number of rasterized pages)−(number of pages whose memory area saved for storing the bitmap data has been released))>0 when the condition expression is satisfied, the rasterizing section holds a processing until the shared storage area opens, and when the condition expression is not satisfied, a process for a memory-full error is performed.

3 Claims, 10 Drawing Sheets

IMAGE FORMING APPARATUS, IMAGE FORMING METHOD AND RECORDING MEDIUM

CROSS-REFERENCE TO RELATED APPLICATION

The present U.S. patent application claims a priority under the Paris Convention of Japanese patent application No. 2006-200612 filed on Jul. 24, 2006, which shall be a basis of correction of an incorrect translation.

BACKGROUND

1. Field of the Invention

The present invention relates to an image forming apparatus, an image forming method, and a recording medium, which convert a data in a page-description language format into a data in a bitmap format and print it.

2. Description of Related Art

In recently years, a network-type image forming apparatus, such as a copy machine, a printer, and a MFP (Multi Function Peripheral) which receives a print data generated in external equipment such as a PC (Personal Computer) etc., i.e. a data in a page-description language format (PDL: Page Description Language)(hereinafter referred to as "a PDL data") as represented by a POSTSCRIPT (registered trademark) or a PCL (Printer Control Language), through a network such as a LAN (Local Area Network) etc., once converts the received data into a data in an intermediate format (hereinafter referred to as "an intermediate data"), holds it on a memory, reads out the intermediate data held on the memory sequentially so as to convert it into a data in a bitmap format (hereinafter referred to as "a bitmap data"), and prints it.

For example, an image forming apparatus which comprises a plurality of PDL interpreters each of which develops a work area in a same memory area and operates a separate task, has been proposed (see JP2001-228991A). Since the interpreters share the memory area, when one interpreter uses the memory so that the memory area for another interpreter is run out, the latter interpreter stops a process until a process of the former interpreter is completed and the memory area is released.

There is an image forming apparatus which stores an intermediate data and a bitmap data in a shared storage area in analysis processing to analyze the PDL data so as to generate the intermediate data, and in rasterizing processing to rasterize the intermediate data so as to generate the bitmap data. In the image forming apparatus, after the bitmap data is generated, an area saved for storing the intermediate data corresponding to the generated bitmap data is released, and after printing the bitmap data, an area saved for storing the printed bitmap data is released.

Since the shared area for storing the intermediate data and the bitmap data is limited, for example, there is the case where a memory area for storing the bitmap data is run out in the middle of generating the bitmap data in the rasterizing process. In such case, if a space area occurs by printing the preceding pages, the rasterizing process may continue after the occurrence of the space area, and if a space area does not occur, it is preferable to execute a process of a memory-full error without waiting the occurrence of the space area. The "memory-full error" is an error in the condition where the memory area is run out and the process cannot be continued any more. Therefore, the matter is how to judge whether or not it is possible to continue the rasterizing process by waiting for printing the preceding pages.

In earlier development, when a memory area of a shared storage area is run out, a judgment whether or not it is possible to continue the rasterizing process is executed based on condition expression (1).

$$\text{(number of analyzed pages)} - \text{(number of pages whose memory area saved for storing the bitmap data has been released)} > 1 \quad (1)$$

The "number of analyzed pages" is the number of pages to which the analysis processing has already been executed so that the intermediate data thereof has been generated. It includes pages to which the rasterizing process has already been executed so that the bitmap data thereof has been generated, and pages to which the area saved for storing the bitmap data after printing has been released.

Figure 10A:
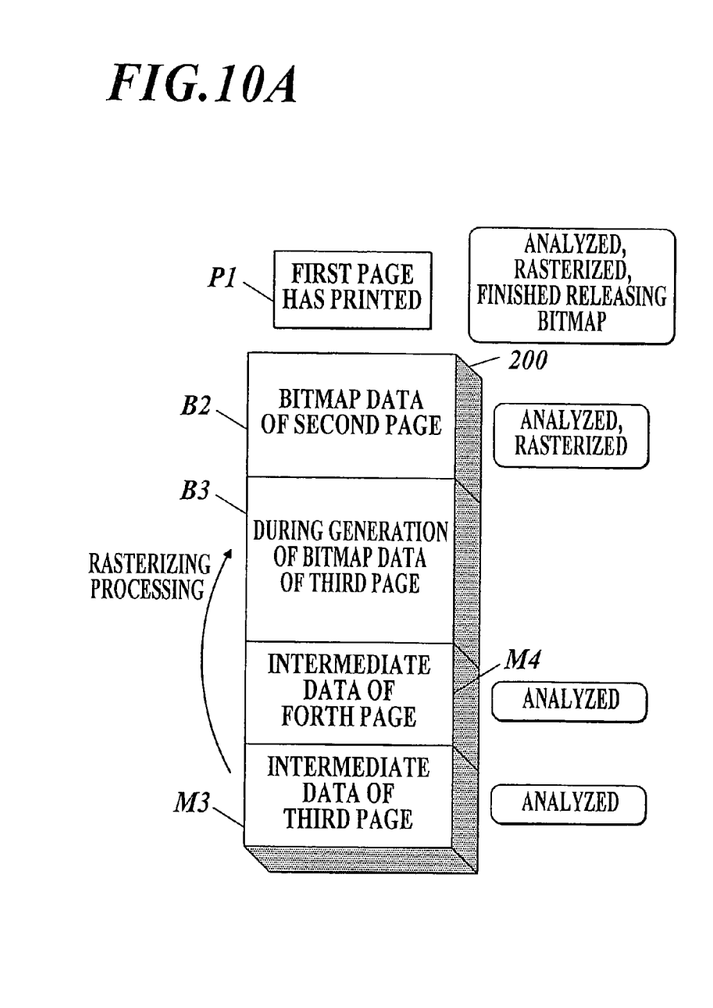
FIG. 10A is an example of a related art where a shared storage area 200 is run out in a rasterizing processing.

FIG. 10A is an example where a shared storage area 200 is run out in the middle of generating a bitmap data B3 of the third page in the rasterizing process. Specifically, an image P1 of the first page has been printed, and a bitmap data B2 of the second page, a bitmap data B3 of the third page under generation, an intermediate data M3 of the third page, and an intermediate data M4 of the forth page have been stored in the shared storage area 200.

In an example shown in FIG. 10A, since "number of analyzed pages" is four and the "number of pages whose memory area stored for storing the bitmap data has been released" is one (1), the condition expression (1) is satisfied. Therefore, it is judged that it is possible to continue the rasterizing process by waiting until the shared storage area 200 opens.

Actually, since a printing processing is executed based on the bitmap data B2 of the second page and an area saved for storing the bitmap data B2 of the second page is released, a space area occurs so that the rasterizing process of the third page can be continued.

However, according to the judgment with the condition expression (1), there is the case where it is impossible to judge correctly whether the rasterizing process can be continued or not.

Figure 10B:
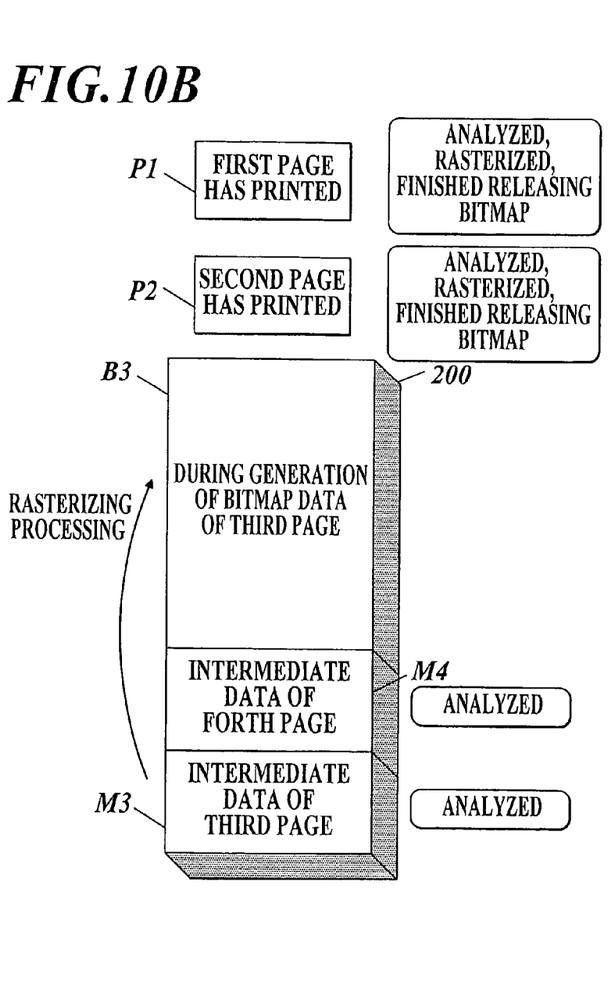
FIG. 10B is another example where the shared storage area 200 is run out in a rasterizing processing.

FIG. 10B is another example where the shared storage area 200 is run out in the middle of generating the bitmap data B3 of the third page. Specifically, the image P1 of the first page and the image P2 of the second page have been printed, and the bitmap data B3 of the third page under generation, the intermediate data M3 of the third page, and the intermediate data M4 of the forth page are stored in the shared storage area 200.

In an example shown in FIG. 10B, since the "number of analyzed pages" is four and the "number of pages whose memory area saved for storing the bitmap data has been released" is two, the condition expression (1) is satisfied. Therefore, it is possible to continue the rasterizing process by waiting until the shared storage area 200 opens.

However, actually, since there is no printable bitmap data, it is impossible to execute a printing processing. Further, since a memory area is run out, the rasterizing process cannot be continued. Thus, according to the judgment whether or not it is possible to continue the rasterizing process, there is the case where a deadlock occurs. Particularly, since a processing speed is getting faster owing to a change of a hardware constitution of an image forming apparatus and a sophistication of a LSI (Large Scale Integration), the deadlock occurs in such cases that the bitmap data under generation in the rasterizing process runs out the shared storing area.

SUMMARY

The present invention has been made upon the consideration of the above problems. It is one of the objects to judge properly whether a rasterizing process can be continued or not when an area for storing a data in a bitmap format is run out, and to prevent an occurrence of a deadlock.

To overcome at least one of the abovementioned problems, an image forming apparatus according to one embodiment that reflects one of aspects of the present invention comprising: a data receiving section to receive a data in a page-description language format; a memory section comprising a shared storage area for temporally storing a data which is generated based on the data in a page-description language format; an analysis section to analyze the data in a page-description language format so as to generate an intermediate data between the data in a page-description language format and a data in a bitmap format which is generated based on the data in a page-description language format, and to store the generated intermediate data in the shared storage area; a rasterizing section to rasterize the intermediate data stored in the shared storage area so as to generate the data in a bitmap format, to store the generated data in a bitmap format in the shared storage area, and to release an area saved for storing the intermediate data corresponding to the stored data in a bitmap format; and a print control section to allow a printing section to perform printing based on the data in a bitmap format stored in the shared storage area, and to release an area saved for storing the printed data in a bitmap format; wherein a rasterizing section comprises a judgment section to judge whether the following condition expression is satisfied or not when the shared storage area is run out in storing the data in a bitmap format, (number of rasterized pages)−(number of pages whose memory area saved for storing the data in a bitmap format has been released))>0 when the condition expression is satisfied, the rasterizing section holds a processing until the shared storage area opens, and when the condition expression is not satisfied, a process for a memory-full error is performed.

BRIEF DESCRIPTION OF THE DRAWINGS

These and other objects, advantages and features of the present invention will become more fully understood from the detailed description given hereinbelow and the appended drawings, and thus are not intended as a definition of the limits of the present invention, and wherein.

DETAILED DESCRIPTION OF THE PREFERRED EMBODIMENT

Hereinafter, the embodiment of the present invention will be described in detail with reference to the drawings.

First, the composition will be described.

Figure 1:
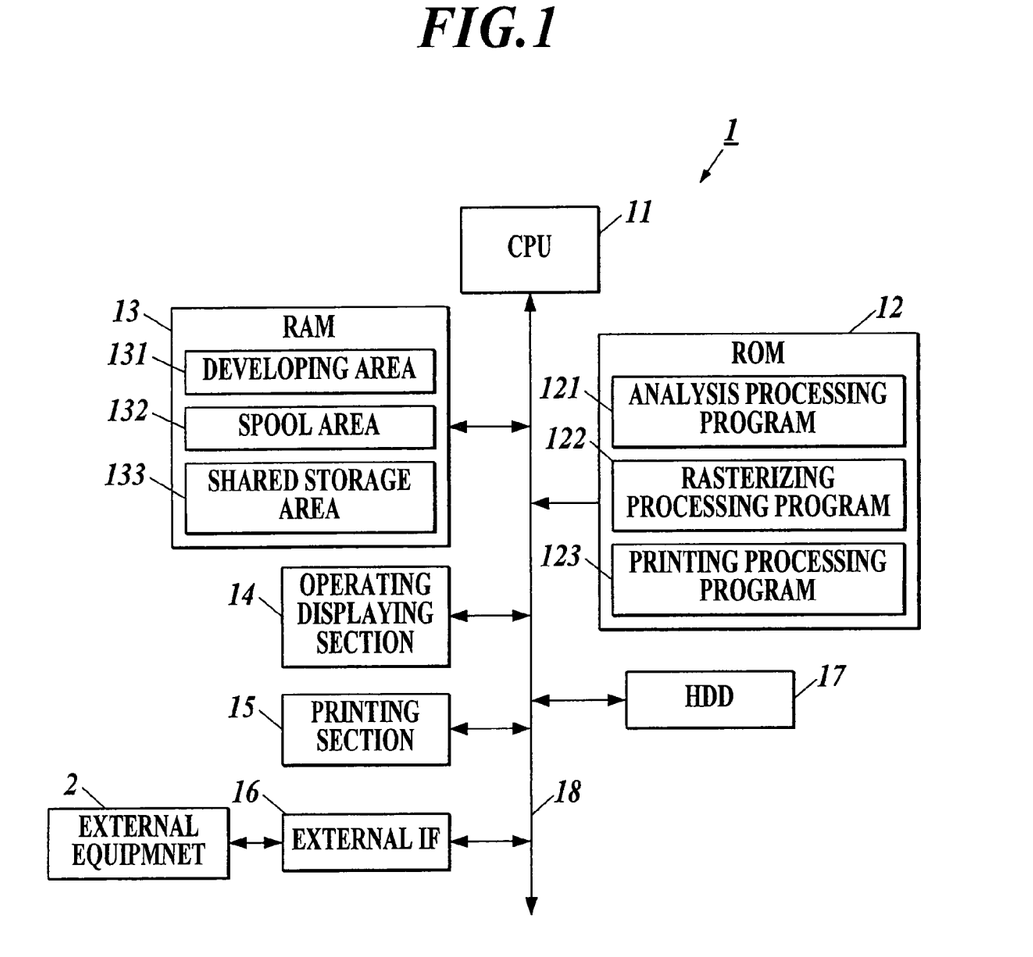
FIG. 1 is a control block diagram of an image forming apparatus 1 of the embodiment of the invention.

FIG. 1 is a control block diagram of an image forming apparatus 1 of the embodiment.

As shown in FIG. 1, the image forming apparatus 1 comprises a CPU (Central Processing Unit) 11, a ROM (Read Only Memory) 12, a RAM (Random Access Memory) 13, an operating displaying section 14, a printing section 15, an external IF (Inter Face) 16, and an HDD (Hard Disk Drive) 17, and these sections are connected to each other through a bus 18. The image forming apparatus 1 is connected with an external equipment 2 through the external IF 16 so as to communicate to each other.

The image forming apparatus 1 receives an image data from the external equipment 2 such as a PC, forms an image on a recording medium according to the received image data to output it.

The CPU 11 develops various processing programs and data stored in the ROM 12 to the RAM 13, and controls, based on the programs, each section of the image forming apparatus 1 integrally.

The ROM 12 stores the various types of processing programs, a data to be used in various types of processes, a data processed by the various types of processing program, and a font data, etc. Specifically, the ROM 12 stores an analysis processing program 121, a rasterizing processing program 122, and a printing processing program 123, etc. The ROM 12 may be composed of a readable nonvolatile medium such as a magnetic storage medium, an optical storage medium and a semiconductor memory. The ROM 12 may be fixedly installed on a control board etc., or may be loaded detachably.

The CPU 11 stores a PDL data such as a postscript data and a PCL data which has been received from the external equipment 2 through the external IF 16, in a spool area 132 of the RAM 13.

The CPU 11 reads out the PDL data stored in the spool area 132 of the RAM 13 in cooperation with the analysis processing program 121 stored in the ROM 12, analyzes the readout PDL data so as to generate an intermediate data which is a data between the PDL data and a bitmap data, and stores the generated intermediate data in a shared storage area 133 of the RAM 13 (analysis processing).

The intermediate data is generated according to a feature of an object (a text data, a graphics data, an image data, etc.) included in the PDL data. For example, the intermediate data of the text data or the graphics data includes a vector format data, and the intermediate data of the image data includes an image format data.

The CPU 11 judges whether or not it is possible to continue the analysis processing based on a condition expression (2), when the shared storage area 133 is run out in storing the intermediate data in the analysis processing. Specifically, the CPU 11 waits until the shared storage area 133 opens up when the condition expression (2) is satisfied, and shifts the process to a process for a memory-full error when the condition expression (2) is not satisfied.

(number of analyzed pages)−(number of pages whose memory area saved for storing the bitmap data has been released)>0  (2)

The "number of analyzed pages" is the number of pages to which the analysis processing has already been executed so that the intermediate data thereof has been generated. It also includes pages to which the rasterizing processing has already been done so that the bitmap data thereof has been generated, and pages whose memory area was saved for storing the bitmap data after a printing has been released.

The CPU 11 rasterizes the intermediate data stored in the shared storage area 133 so as to generate the bitmap data in cooperation with the rasterizing processing program 122 stored in the ROM 12, stores the generated bitmap data in the shared storage area 133 of the RAM 13, and releases an area saved for storing the intermediate data corresponding to the stored bitmap data (rasterizing processing).

The CPU 11 judges whether or not it is possible to continue the rasterizing processing based on the condition expression (3), when the shared storage area 133 is run out in storing the bitmap data in the rasterizing processing. Specifically, the CPU 11 waits until the shared storage area 133 opens up when the condition expression (3) is satisfied, and shifts the process to the process for the memory-full error when the condition expression (3) is not satisfied.

$$(\text{number of rasterized pages}) - (\text{number of pages whose memory area saved for storing the bitmap data has been released}) > 0 \quad (3)$$

The "number of rasterized pages" is the number of pages to which the rasterizing processing has already been performed so that the bitmap data has been generated. It also includes the number of pages whose memory area saved for storing the bitmap data has been released after printing.

The CPU 11 allows the printing section 15 to print the page based on the bitmap data stored in the shared storage area 133 in cooperation with the printing processing program 123 stored in the ROM 12, and releases the area of the shared storage area 133 saved for storing the printed bitmap data (printing processing).

The RAM 13 forms a working area for storing various types of processing programs to be executed by the CPU 11 and a data of these programs in the meantime. The RAM 13 has a developing area 131, the spool area 132, and the shared storage area 133. The RAM 13 may be composed of a readable and writable storage medium such as an HDD, an MRAM (Magnetic Random Access Memory) and a flash memory, etc., but it is not limited to them. The RAM 13 may be fixedly installed on a control board etc., or may be loaded detachably.

The developing area 131 is an area where the various types of programs and data stored in the ROM 12 are developed.

The spool area 132 is to store the PDL data received from the external equipment 2.

Figure 2:
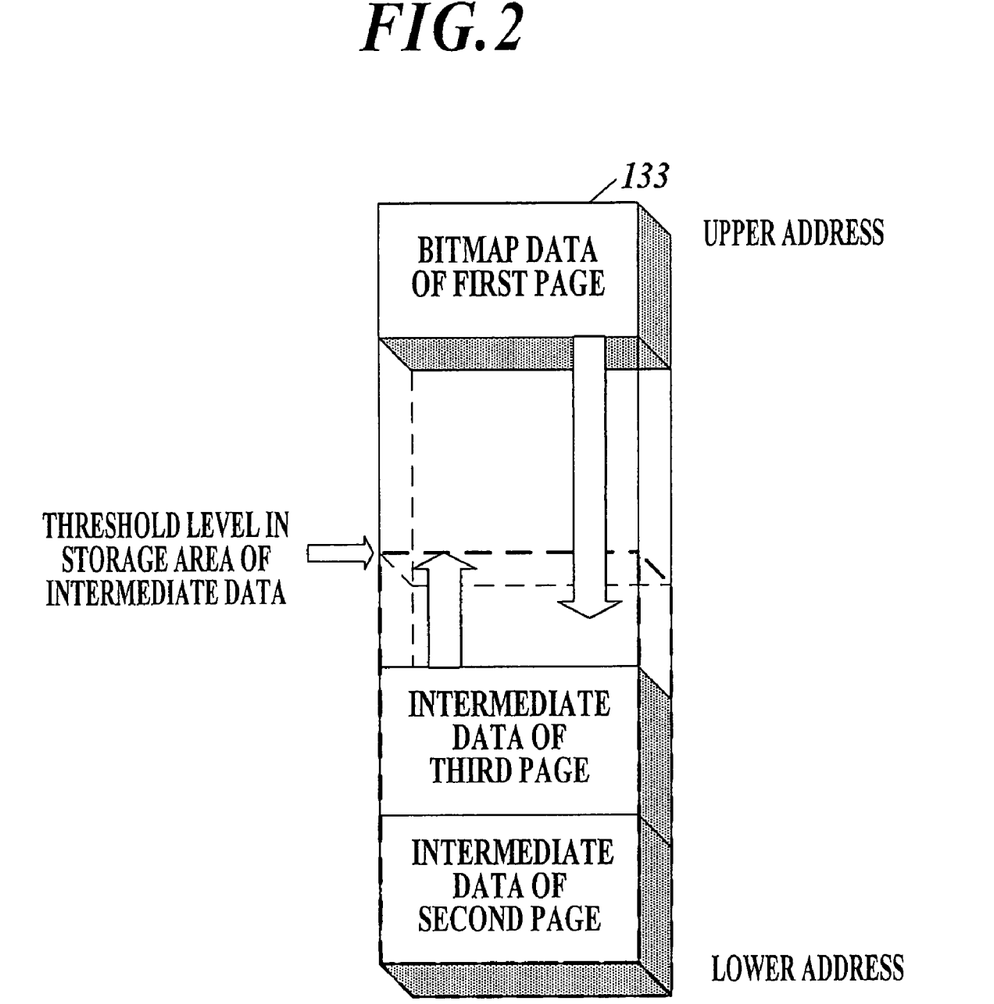
FIG. 2 is a diagram to explain a shared storage area 133.

The shared storage area 133 is, as shown in FIG. 2, a shared storage area where the intermediate data and bitmap data are stored temporarily. The bitmap data is stored from an upper address toward a lower address in the shared storage area 133, and the intermediate data is stored from the lower address toward the upper address in the shared storage area 133. By doing so, it is possible to use a memory more effectively than in the case of assigning fixed areas for the intermediate data and the bitmap data respectively.

In the shared storage area 133, if the area for storing the intermediate data and the area for storing the bitmap data are admitted without limit in the shared storage area 133, it becomes impossible to perform printing when the area for storing the bitmap data is run out. For this reason, the bitmap data can be stored without limit in the shared storage area 133, while storing the intermediate data is limited by setting a threshold level. The threshold level is set so that an assumed data size of a bitmap data of one (1) page can be stored in a remaining area of the shared storage area 133. However, there is the case where it is impossible to store the bitmap data of one (1) page only in the remaining area of the shared storage area 133, because data quantity of each page varies. The threshold level is set according to a resolution of the image forming apparatus 1, the number of colors of an image development equipment provided to the image forming apparatus 1, and a minimum compression rate.

The operating displaying section 14 comprises a LCD (Liquid Crystal Display), a touch panel provided to cover the LCD, operation keys, and so on. The operating displaying section 14 displays various setting screens for inputting various setting conditions, various operating results, etc. on the LCD, according to a displaying signal inputted from the CPU 11. The operating displaying section 14 outputs an operating signal inputted on the operation keys or the touch panel to the CPU 11.

The printing section 15 performs printing on the recording medium based on the bitmap data. Specifically, the printing section 15 comprises a photoconductor drum as an image carrier, a charging part which charges the photoconductor drum, an exposing part which scans and exposes a surface of the photoconductor drum based on the bitmap data, a developing part which allows a toner to adhere to the photoconductor drum, a transfer part which transfers a toner image formed in the photoconductor drum to the recording medium, a cleaning part which clears away a residual toner on the photoconductor drum, and a fixing part which fixes the toner image formed on the recording medium.

The external IF 16 is a communication interface to connect to a network such as a LAN, e.g. a NIC (Network Interface Card) and a modem, and receives the PDL data from the external equipment 2. The image forming apparatus 1 can be connected with the external equipment 2 through the external IF 16 in a local area network.

The HDD 17 is a storage device to store an additional font data, a job data, and so on.

Next, an operation of the image forming apparatus 1 will be explained.

Figure 3:
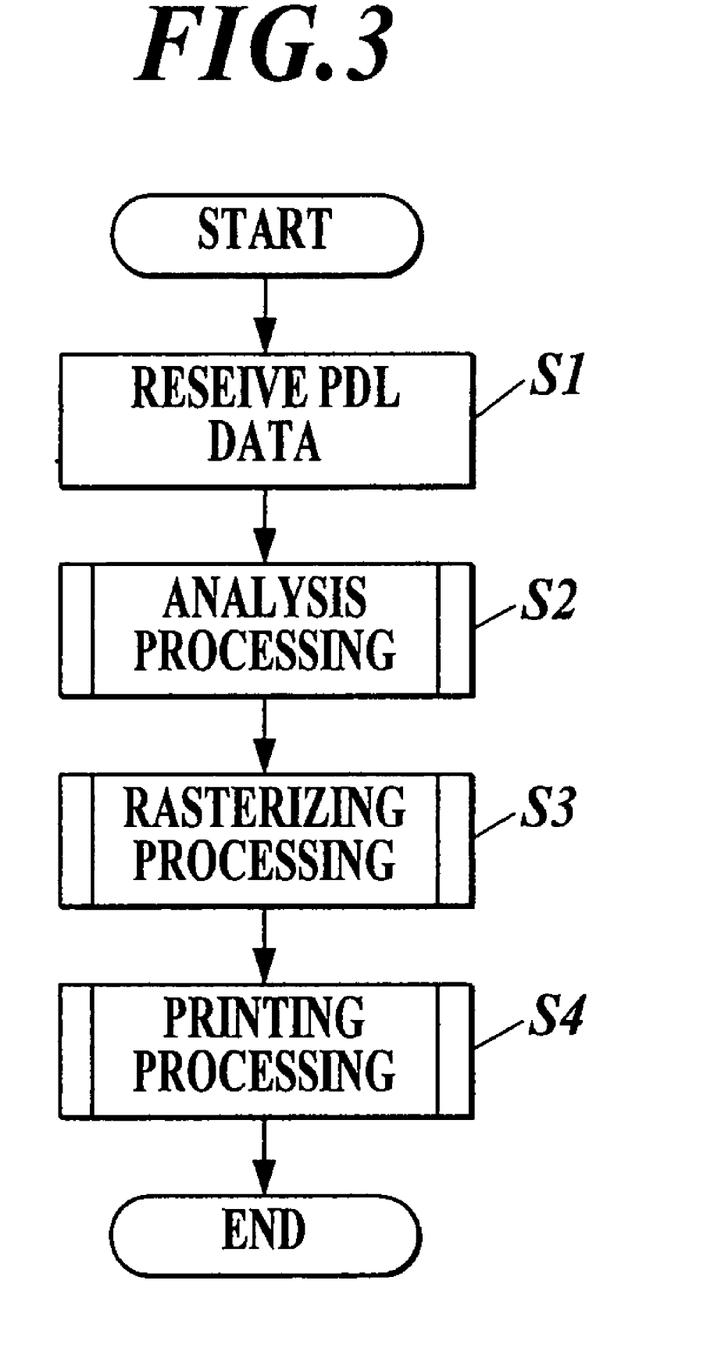
FIG. 3 is a main flow diagram at printing by the image forming apparatus 1.

FIG. 3 is a main flow diagram of the printing in the image forming apparatus 1. The CPU 11 executes the operation shown in FIG. 3. The processing to be realized by the following steps S1 to S4 are performed in a multi task manner so that it is possible to process a plurality of pages in parallel. For the convenience of explanation, the steps S1 to S4 are shown in chronologic order.

First, the CPU 11 stores the PDL data received from the external equipment 2 through the external IF 16 in the spool area 132 (Step S1).

After storing the PDL data in the spool area 132, the CPU 11 reads out the PDL data stored in the spool area 132, analyzes the readout PDL data so as to generate the intermediate data and stores the generated intermediate data in the shared storage area 133 (analysis processing) (Step S2).

After the intermediate data of one (1) page is stored in the shared storage area 133, the CPU 11 reads out the intermediate date stored in the shared storage area 133, rasterizes the readout intermediate data in a predetermined unit basis (a band unit) so as to generate the bitmap data, compresses it in a band unit basis and stores it in the shared storage area 133 (rasterizing processing) (Step S3).

After the bitmap data of one (1) page is stored in the shared storage area 133, the CPU 11 reads out and decompresses the bitmap data of one (1) page from the shared storage area 133, decompresses it, outputs the decompressed bitmap data to the printing section 15 and prints the image of one (1) page on the recording medium (printing processing) (Step S4).

In the image forming apparatus 1, the processes shown in FIG. 3 (receiving the PDL data, analysis processing, rasterizing processing, and printing processing) are performed in a multi task manner so that these processes are performed in parallel at the same time when the images of a plurality of pages are printed.

A processing priority is set to be receiving the PDL data, printing processing, rasterizing processing, and an analysis processing in that order, when they are performed in a multi task manner. For example, when the processes of a plurality of pages are performed in parallel, if the bitmap data of any one (1) page is completed, the printing of the completed bitmap data takes priority over the rasterizing processing and analysis processing of the other pages.

Figure 4:
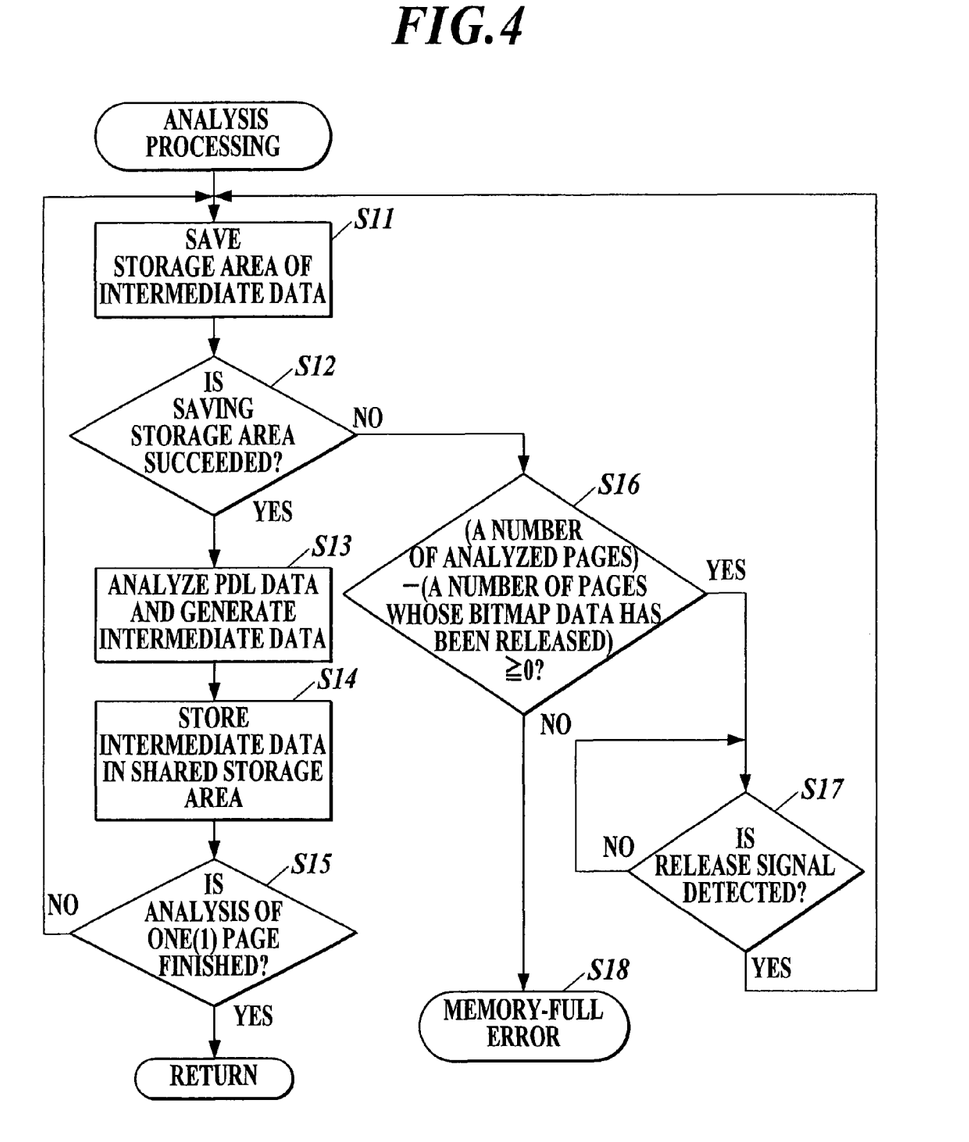
FIG. 4 is a flow chart showing an analysis processing.

Next, the analysis processing executed in Step 2 in FIG. 3 will be explained with reference to FIG. 4. The analysis processing is to generate the intermediate data of one (1) page based on the PDL data and to store it in the shared storage area 133. The CPU 11 executes the analysis processing.

First, the CPU 11 saves, in the shared storage area 133, the area for storing the intermediate data (Step S11). When the area for storing the intermediate data is successfully saved (Step 12; YES), the CPU 11 analyzes the PDL data stored in the spool area 132 so as to generate the intermediate data (Step S13). Then the CPU 11 stores the generated intermediate data in the shared storage area 133 of the RAM 13.

Next, the CPU 11 judges whether or not the analysis processing of one (1) page has been completed (Step S15). When the analysis processing of one (1) page has not been completed (Step S15: NO), the process goes back to Step S11. When the analysis processing of one (1) page has been completed (Step S15; YES), the process ends.

In Step S12, when the area for storing the intermediate data cannot be saved (Step S12; NO), the CPU 11 judges whether or not the condition expression (2) is satisfied (Step S16).

The condition expression (2) shows a presence of a page which has analyzed but has not printed yet. In other words, when the condition expression (2) is satisfied, it is assured that the area saved for storing the intermediate data is released in rasterizing processing, or the area saved for storing the bitmap data is released in printing processing, so that the shared storage area 133 is opened up.

In Step S16, if the condition expression (2) is satisfied (Step S16;YES), the CPU 11 waits until a signal which shows that the area of the shared storage area 133 saved for storing the intermediate data or the bitmap data is released (hereinafter referred to as "a release signal") is detected (Step S17). When the CPU 11 detects the release signal (Step S17; YES), the process goes back to Step S11.

In Step S16, if the condition expression (2) is not satisfied (Step S16; NO), the process shifts to the process of the memory-full error (Step S18). For example, a message for giving notice of the memory-full error is displayed on the operating displaying section 14, and the process stops.

Figure 5:
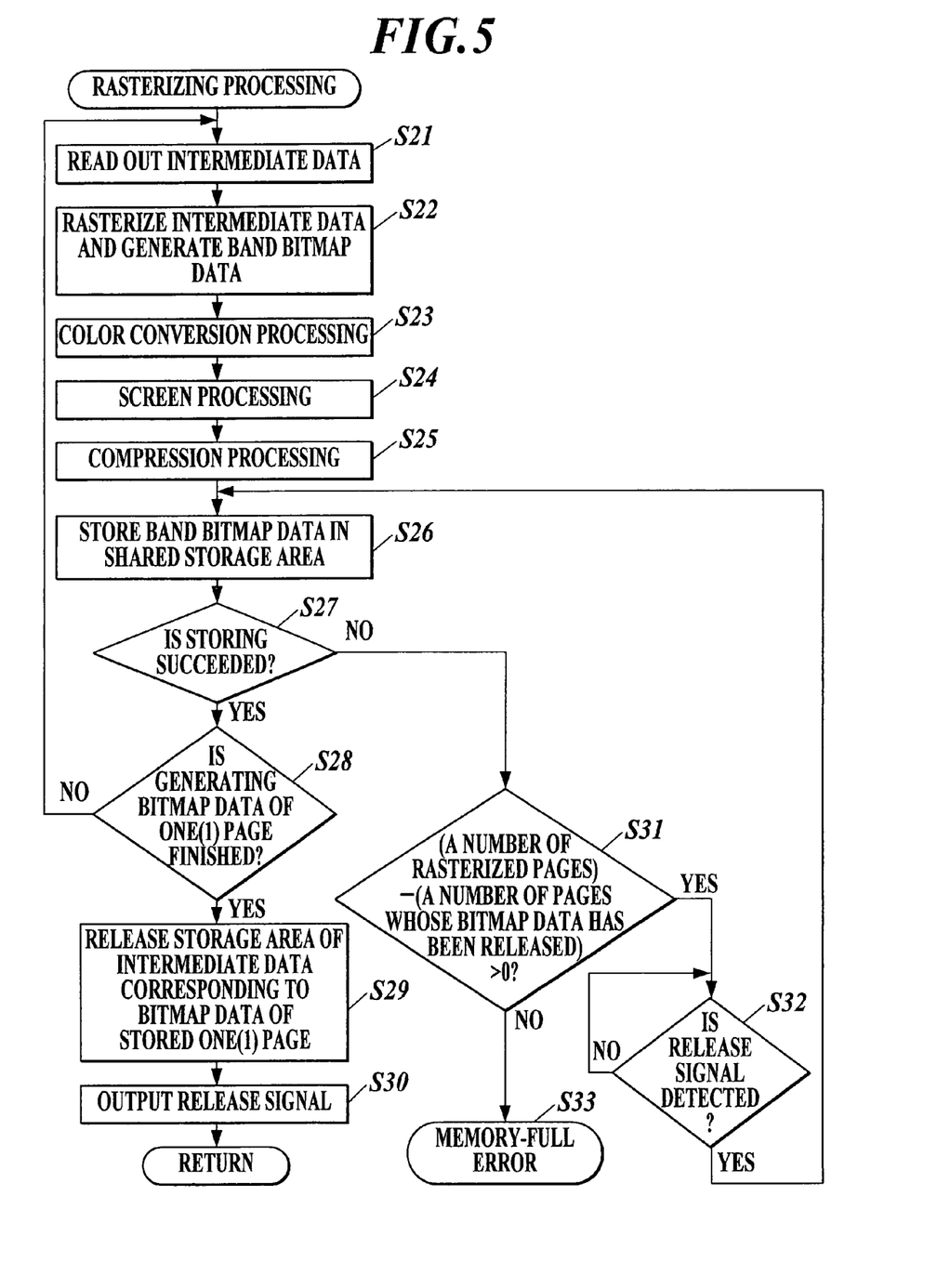
FIG. 5 is a flow chart showing a rasterizing processing.

Next, the rasterizing processing executed in Step S3 in FIG. 3 will be described with reference to FIG. 5. The rasterizing processing is to generate the bitmap data based on the intermediate data of one (1) page and to store it in the shared storage area 133. The CPU 11 executes the rasterizing processing.

First, the CPU 11 reads out the intermediate data from the shared storage area 133 (Step S21), rasterizes the readout intermediate data in the band unit basis, and generates the bitmap data (Step S22). Hereinafter, the bitmap data generated in the band unit basis is referred to as a band-bitmap data.

Next, the CPU 11 executes a color conversion process (Step S23), a screen process (Step S24), and a compression process (Step S25), to the band-bitmap data.

Next, the CPU 11 stores the band-bitmap data in the shared storage area 133 (Step S26), and judges whether or not the storing the band-bitmap data has been successful (Step S27). When the band-bitmap data has been successfully stored (Step S27; YES), the CPU 11 judges whether or not the generation of the bitmap data of one (1) page has been finished (Step S28).

When the generation of the bitmap data of one (1) page has not been finished (Step S28; NO), the process goes back to Step S21.

When the generation of the bitmap data of one (1) page is finished (Step S28; YES), the CPU 11 releases the area saved for storing the intermediate data corresponding to the stored bitmap data of one (1) page in the shared storage area 133 (Step S29). The CPU 11 outputs the release signal (Step S30), and then the rasterizing processing ends.

In Step S27, when the storing of the band-bitmap data is failed (Step S27; NO), the CPU 11 judges whether or not the condition expression (3) is satisfied (Step 31).

The condition expression (3) shows a presence of a page which has been rasterized but has not been printed. In other word, if the condition expression (3) is satisfied, it is assured that the area saved for storing the bitmap data is released in printing processing, so that the shared storage area 133 opens.

In the Step S31, if the condition expression (3) is satisfied (Step S31; YES), the CPU waits until the release signal is detected (Step S32). When the CPU 11 detects the release signal (Step S32; YES), the process goes back to Step S26.

In the Step S31, if the condition expression (3) is not satisfied (Step S31; NO), the process shifts to the process of the memory-full error (Step S33).

Figure 6:
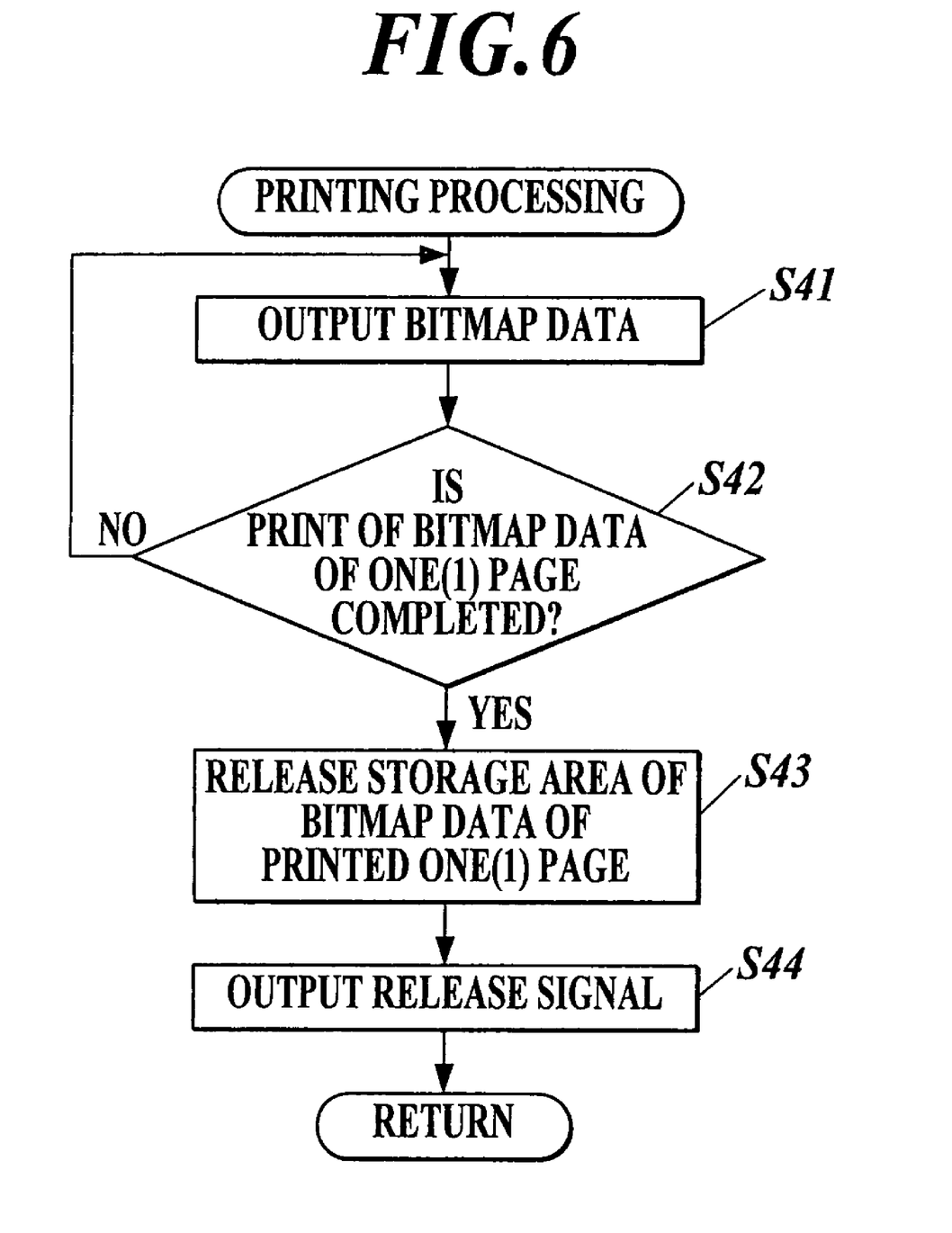
FIG. 6 is a flow chart showing a printing processing.

Next, the printing processing executed in Step S4 in FIG. 3 will be described with reference to FIG. 6. The printing processing is a process to perform printing on the recording medium based on the bitmap data of one (1) page. The CPU 11 executes the printing processing.

First, the CPU 11 reads out the bitmap data in sequence from the shared storage area 133, and outputs it to the printing section 15 (Step S41).

Then, the CPU 11 judges whether or not the printing of the bitmap data of one (1) page in the printing section 15 has been completed (Step S42). When the printing the bitmap data of one (1) page has not been completed (Step S42; NO), the process goes back to Step S41.

When the printing the bitmap data of one (1) page has been completed (Step S42; YES), the CPU 11 releases the area saved for storing the print-completed bitmap data of one (1) page in the shared storage area 133 (Step S43). Then, the CPU 11 outputs the release signal (Step S44).

The judgement whether or not it is possible to continue the analysis processing when the area for storing the intermediate data is run out in the analysis processing will be described with reference to FIGS. 7A and 7B.

Figure 7A:
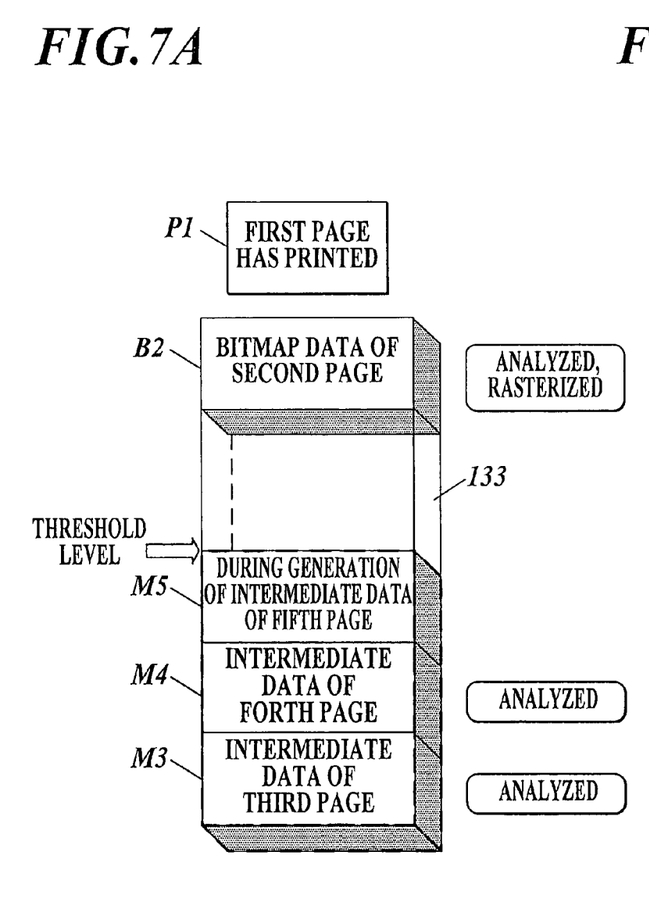
FIG. 7A is an example where an intermediate data stored in the shared storage area 133 reaches a threshold level in the middle of the analysis processing.

FIG. 7A is an example where the area of the shared storage area 133 for storing the intermediate data reaches the threshold level in the analysis processing. Specifically, an image P1 of the first page has been printed, and the area where the bitmap data of the first page was stored has been released. A second page has been rasterized, and the bitmap data B2 of the second page has been stored in the shared storage area 133. A third page and a forth page have been analyzed, and the intermediate data M3 of the third page and the intermediate data M4 of the forth page have been stored in the shared storage area 133. In the analysis processing of a fifth page, since the intermediate data stored in the shared storage area 133 reaches a threshold level in the middle of generating the intermediate data M5 of the fifth page, it is judged whether or not the analysis processing can be continued.

Since the "number of the analyzed pages" is four and the "number of the pages whose memory area saved for storing the bitmap data has been released" is one (1), the condition expression (2) is satisfied. Thus, it is judged that it is possible to continue the analysis processing by waiting until the area of the shared storage area for storing the intermediate data 133 is opened up in the shared storage area 133.

Figure 7B:
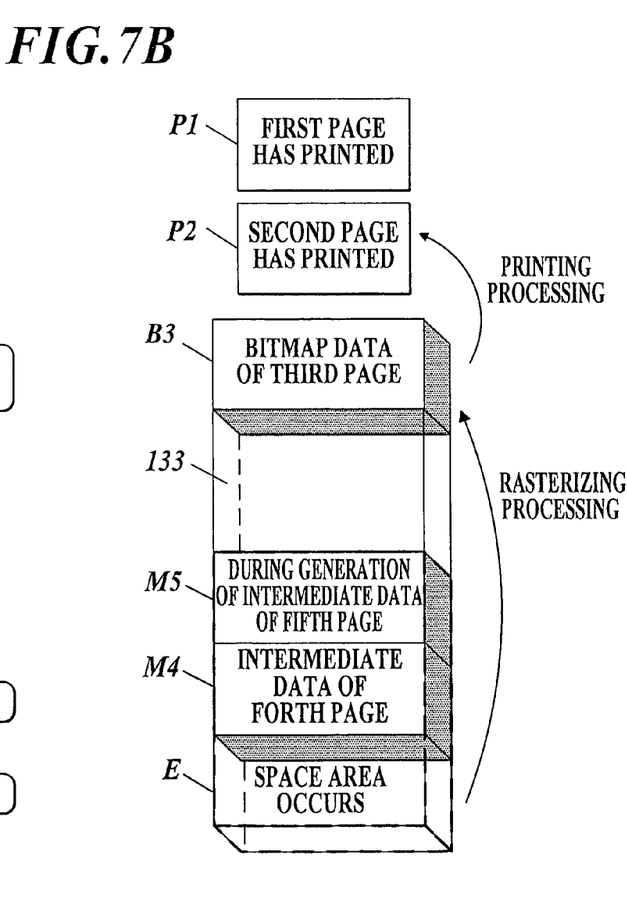
FIG. 7B is a diagram to explain that a space area E occurs in the shared storage area 133.

As shown in FIG. 7B, when the image P2 of the second page is printed in the printing processing of the bitmap data B2 of the second page and the bitmap data B3 of the third page is generated in the rasterizing processing of the intermediate data M3 of the third page, the area saved for storing the intermediate data M3 of the third page is released, so that a space area E occurs in the shared storage area 133. As a result, the analysis processing of the fifth page can be continued.

Next, the judgement whether or not the rasterizing processing can be continued, in the condition where the area for storing the bitmap data is run out in the rasterizing processing, will be described with reference to FIGS. 8A, 8B and 9.

Figure 8A:
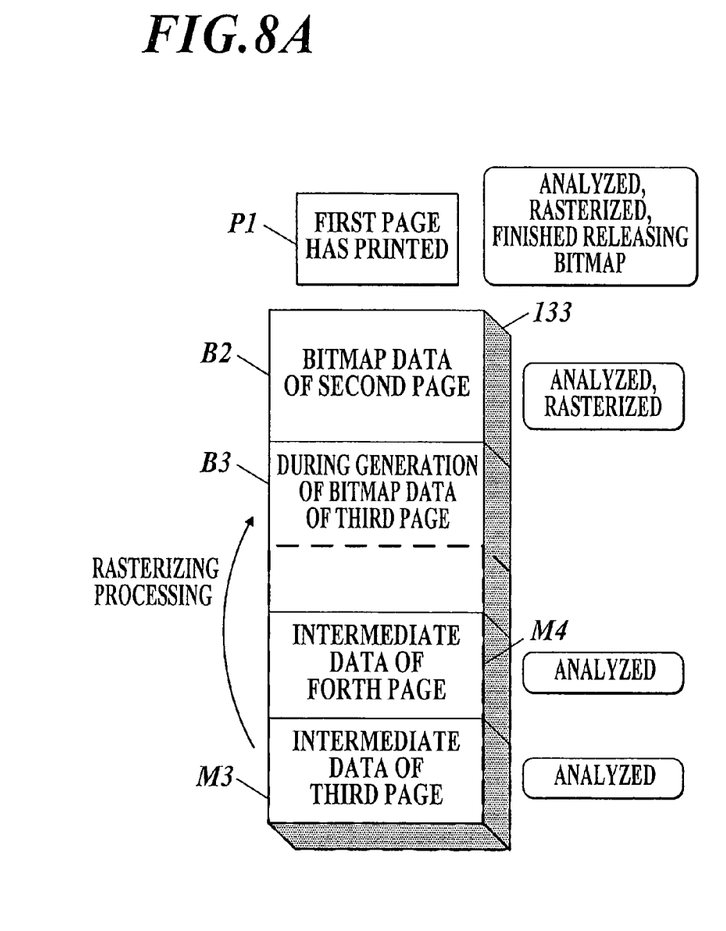
FIG. 8A is an example where the shared storage area 133 is run out in the middle of the rasterizing processing.

FIG. 8A is an example where the shared storage area 133 is run out in the middle of the rasterizing processing. Specifically, the image P1 of the first page has been printed, and the area where the bitmap data of the first page was stored has been released. The second page has been rasterized, and the bitmap data B2 of the second page is stored in the shared storage area 133. The third page and the forth page have been analyzed, and the intermediate data M3 of the third page and the intermediate data M4 of the forth page is stored in the shared storage area 133 together. Since the shared storage area 133 is run out in the middle of generating the bitmap data B3 of the third page in the rasterizing processing of the third page, it is judged whether or not the rasterizing processing can be continued.

Since the "number of the rasterized pages" is two and the "number of the pages whose memory area saved for storing the bitmap data has been released" is one (1), the condition expression (3) is satisfied. Thus, it is judged that it is possible to continue the rasterizing process by waiting until the area of the shared storage area 133 for storing the bitmap data opens.

Figure 8B:
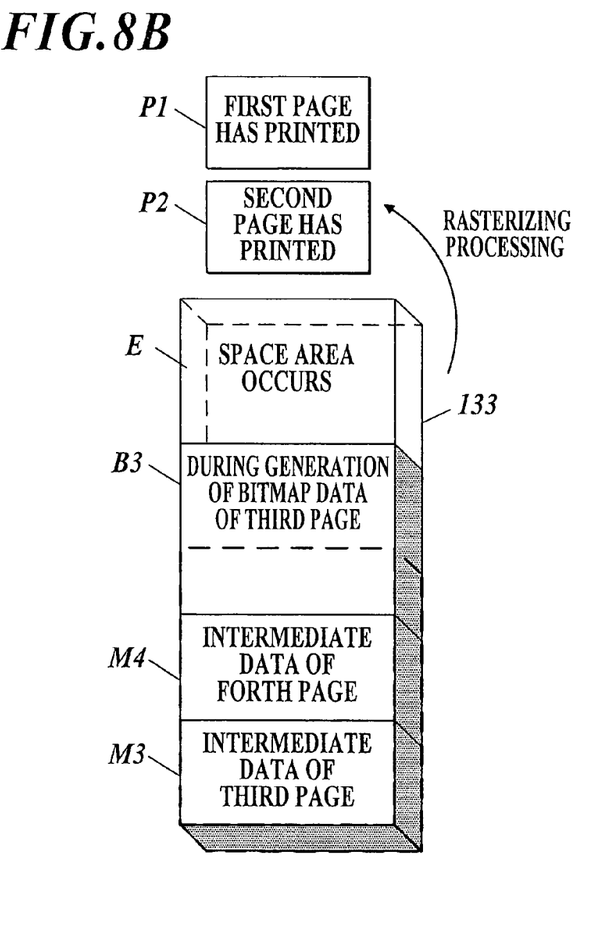
FIG. 8B is a diagram to explain that the space area E occurs in the shared storage area 133.

As shown in FIG. 8B, when the image P2 of the second page is printed in the printing processing of the bitmap data B2 of the second page, the area saved for storing the bitmap data B2 of the second page is released, so that the space area E occurs in the shared storage area 133. Thus, the rasterizing processing of the third page can be continued.

Figure 9:
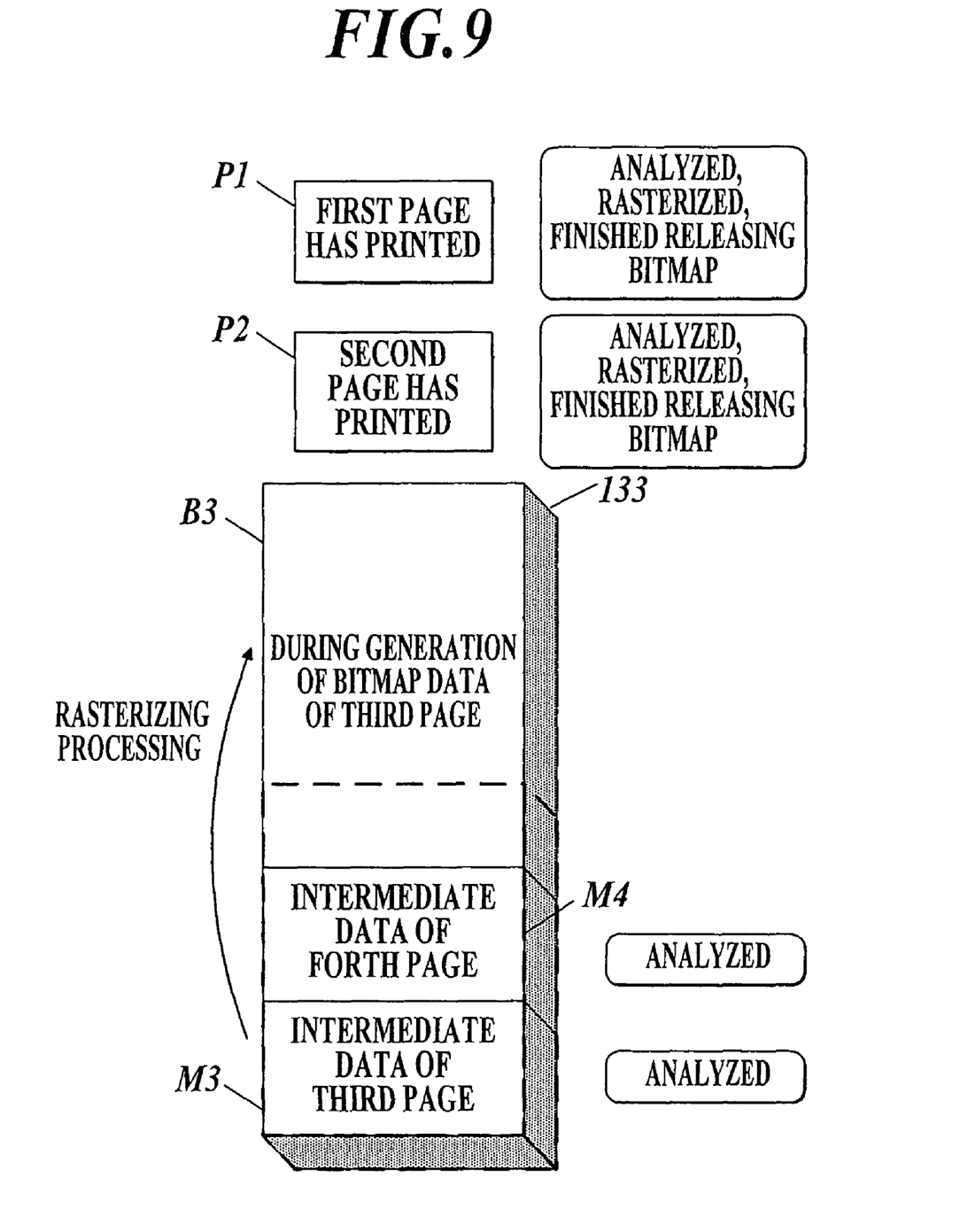
FIG. 9 is another example where the shared storage area 133 is run out in the middle of the rasterizing processing.

FIG. 9 is an example where the shared storage area 133 is run out in the middle of the rasterizing processing. Specifically, the image P1 of the first page and the image P2 of the second page have been printed, and the area where the bitmap data of the first page and the bitmap data of the second page were stored has been released. The third page and the forth page have been analyzed, and the intermediate data M3 of the third page and the intermediate data M4 of the forth page is stored in the shared storage area 133. Since the shared storage area 133 is run out in the middle of generating the bitmap data B3 of the third page in the rasterizing processing of the third page, it is judged whether or not the rasterizing processing can be continued.

Since the "number of the rasterized pages" is two and the "number of the pages whose memory area saved for storing the bitmap data has been released" is two, the condition expression (3) is not satisfied. Thus, it is judged that the process is to advance to process of the memory-full error.

Actually, in the example shown in FIG. 9, since there is no printable bitmap data, the printing processing cannot be executed. Also, since the area of memory is run out, the rasterizing processing cannot be continued. If the process does not advance to the process of the memory-full error although the space area will not occur, the process will be kept in a wait state to the end of time (an occurrence of a deadlock). Therefore, it can be said that the judgment result of memory-full error was right.

As mentioned above, according to the image forming apparatus 1, when the area of the shared storage area 133 for storing the bitmap data is run out in the rasterizing processing, it is possible to judge properly whether or not it is possible to continue the rasterizing processing by waiting until the space area occurs, or whether or not the process advances to the process of the memory-full error without waiting until the space area occurs, based on the condition expression (3). Since it is possible to judge properly whether or not the rasterizing processing can be continued, the occurrence of the deadlock can be prevented.

Above description of the embodiment is an example of the invention, and the present invention is not limited to the embodiment. The detail composition and the detail operation of the image forming apparatus can be changed appropriately within the spirit of the invention.

What is claimed is:

1. An image forming apparatus comprising:
   a data receiving section to receive a data in a page-description language format;
   a memory section comprising a shared storage area for temporally storing a data which is generated based on the data in a page-description language format;
   an analysis section to analyze the data in a page-description language format so as to generate an intermediate data between the data in a page-description language format and a data in a bitmap format which is generated based on the data in a page-description language format, and to store the generated intermediate data in the shared storage area;
   a rasterizing section to rasterize the intermediate data stored in the shared storage area so as to generate the data in a bitmap format, to store the generated data in a bitmap format in the shared storage area, and to release an area saved for storing the intermediate data corresponding to the stored data in a bitmap format; and
   a print control section to allow a printing section to perform printing based on the data in a bitmap format stored in the shared storage area, and to release an area saved for storing the printed data in a bitmap format;
   wherein a rasterizing section comprises a judgment section to judge whether or not the following condition expression is satisfied when the shared storage area is run out in storing the data in a bitmap format, (number of rasterized pages)−(number of pages whose memory area saved for storing the data in a bitmap format has been released))>0 when the condition expression is satisfied, the rasterizing section holds a processing until the shared storage area opens, and when the condition expression is not satisfied, a process for a memory-full error is performed.

2. An image forming method comprising the steps of:
   receiving a data in a page-description language format;
   analyzing the data in a page-description language format so as to generate an intermediate data between the data in a page-description language format and a data in a bitmap format based on the data in a page-description language format, and storing the generated intermediate data in a shared storage area in a memory section;

rasterizing the intermediate data stored in the shared storage area so as to generate the data in a bitmap format, storing the generated data in a bitmap format in the shared storage area, and releasing an area saved for storing the intermediate data corresponding to the stored data in a bitmap format; and allowing a printing section to perform printing based on the data in a bitmap format stored in the shared storage area, and releasing an area saved for storing the printed data in a bitmap format;

wherein the rasterizing step includes judging whether or not the following condition expression is satisfied when the shared storage area is run out in storing the data in a bitmap format, (number of rasterized pages)−(number of pages whose memory area saved for storing the data in a bitmap format has been released))>0 when the condition expression is satisfied, the rasterizing step holds a processing until the shared storage area opens, and when the condition expression is not satisfied, a process for a memory-full error is performed.

3. A computer readable medium storing a program which causes a computer to realize the functions of:

a receiving function to receive a data in a page-description language format;

an analysis function to analyze the data in a page-description language format so as to generate an intermediate data between the data in a page-description language format and a data in a bitmap format based on the data in a page-description language format, and to store the generated intermediate data in a shared storage area in a memory section;

a rasterizing function to rasterize the intermediate data stored in the shared storage area so as to generate the data in a bitmap format, to store the generated data in a bitmap format in the shared storage area, and to release an area saved for storing the intermediate data corresponding to the stored data in a bitmap format; and a print control function to allow a printing section to perform printing based on the data in a bitmap format stored in the shared storage area, and to release an area saved for storing the printed data in a bitmap format;

wherein a rasterizing function includes a judgment function to judge whether or not the following condition expression is satisfied when the shared storage area is run out in storing the data in a bitmap format, (number of rasterized pages)−(number of pages whose memory area saved for storing the data in a bitmap format has been released))>0 when the condition expression is satisfied, the rasterizing function holds a processing until the shared storage area opens, and when the condition expression is not satisfied, a process for a memory-full error is performed.

* * * * *